THERMAL COPYING PROCESS WITH LIGNIN REACTION IN COPY SHEET

Filed Dec. 30, 1965

INVENTOR
JAMES O. THOMPSON

United States Patent Office 3,471,309
Patented Oct. 7, 1969

3,471,309
THERMAL COPYING PROCESS WITH LIGNIN REACTION IN COPY SHEET
James O. Thompson, Los Gatos, Calif., assignor to International Business Machines Corporation, Armonk, N.Y., a corporation of New York
Filed Dec. 30, 1965, Ser. No. 517,657
Int. Cl. G03c *11/22;* C23c *13/00*
U.S. Cl. 117—1.7                                         6 Claims

ABSTRACT OF THE DISCLOSURE

A method for producing copies whereby a volatilizable first reactant is transferred from a printed original to a receiving sheet containing a substantial amount of lignin material, such that said volatilizable material reacts with said lignin in said receiving sheet to form an image.

---

The present invention relates to a method for producing copies.

According to the present invention, copies are produced from an original by first providing a base sheet containing lignin or a lignin derivative, thermally treating an original to cause heat to be absorbed in those portions of the original which are to be copied and then, by selective heat transfer from the heated portions of the original, causing a reactant material to be transferred to the receiving sheet. The reactant material is a compound or composition which reacts with the lignin or lignin material in the receiving sheet to produce a useful image.

The receiving sheet of the present copying system may either contain the lignin material distributed throughout it or carry a lignin as a surface coating or impregnation. Preferably, the receiving sheet is a low cost paper such as those made from ground wood, unbleached sulfite or unbleached semi-chemical sulfite pulps. Common newsprint is an example of a very satisfactory receiving sheet.

The reactant which is transferred to the receiving sheet to form the desired image is a chemical which will react with lignin or its derivatives to form a useful image. Such compounds include for example 4-aminophenyl glycine hydrochloride, aniline hydrochloride, 2,3-diaminopyridine, 2,6-diaminopyridine.

The reactant may be transferred to the receiving sheet in a number of ways. Preferably, an original is formed by typing, printing or any other suitable procedure and is then uniformly coated with a solution of a reactant of the type described. The original, coated with the liquid, is then uniformly heated. The printed portions selectively or preferentially absorb heat and cause the liquid coating on the original to be selectively transferred to the receiving sheet. On contact with the receiving sheet, the reactant enters a color forming reaction with lignin to produce the desired image.

Alternatively, a neutral or non-reactive liquid may be transferred from the original in the manner described to form a latent image which is then developed by application of a toner. In this case the toner contains a reactant which forms an image on contact with the lignin containing receiving sheet.

In another embodiment, the original is printed with an ink which contains the desired reactant. Uniform heating of the original with the printed surface in contact with the lignin containing receiving sheet will then bring about transfer of sufficient reactant to form a corresponding image on the receiving sheet. As a variety of this procedure, the reactant printed on the original may first be transferred to a smooth master plate, such as a foil or glass plate, by thermal distillation and then the reverse image is similarly transferred from the master to a receiving sheet of the present type to form the colored image.

Figure 1:
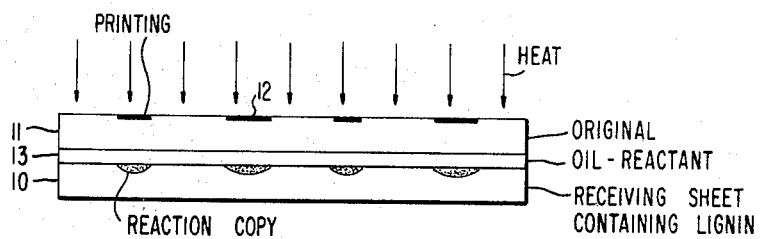
Figure 2:
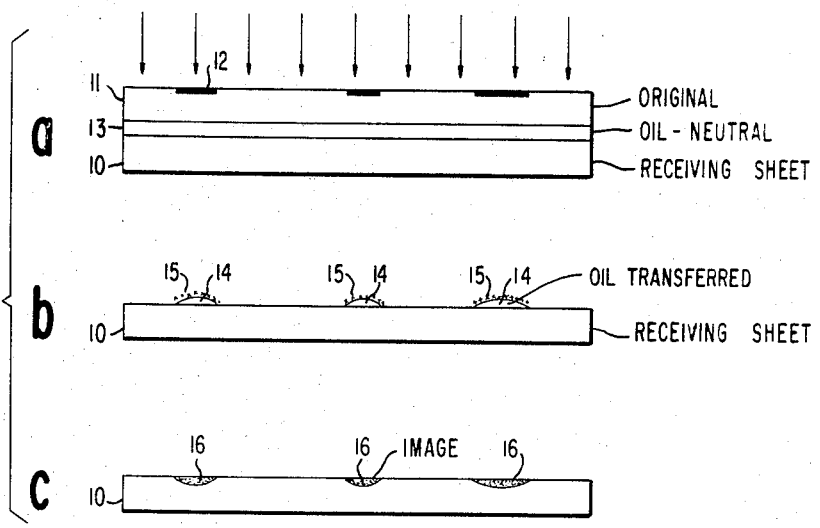
Figure 3:
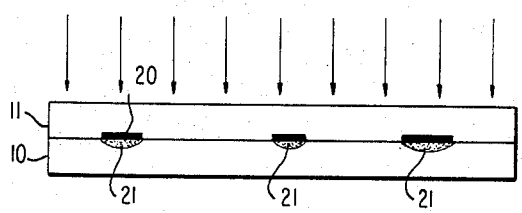

The invention will be more fully appreciated in the light of the following detailed description of certain preferred embodiments and by reference to the accompanying drawing in which FIGURES 1, 2 and 3 are schematic edge views of sheet materials utilized in accomplishing the process of the present invention.

Referring to FIGURE 1 of the drawing, it will be seen that a receiving sheet 10 is provided which contains a substantial amount of lignin or a lignin derivative.

The chemical composition of lignin is not known with precision. Lignin is the major non-carbohydrate constituent of wood and woody plants and may comprise about 25% of such materials. It functions as a natural plastic binder for the cellulosic fibers of wood, straw, etc. Rather than referring to a specific compound, the term "lignin" actually is a collective term for a group or system of compounds of high molecular weight. A summary of the functional groups and interunit linkages in lignin as it is now known is described by E. Adler in Das Papier, 15, page 604 (1961). The color forming group is generally regarded to be the coniferyl aldehyde group.

Paper containing lignin may be readily produced by controlling the pulping action during the papermaking process. During the manufacture of paper pulp from wood, straw, etc. by the conventional chemical processes such as the sulfate, sulfite, and soda pulping, a certain amount of the lignin is removed. In less expensive types of paper, produced by milder chemical processes, however, a very large percentage of the lignin is retained in the pulp. Such processes are commonly referred to as semi-chemical or chemi-ground wood. For example, in newsprint or ground wood papers, almost all of the lignin in the original wood is present unchanged in the final papers.

As an example, suitable lignin-containing papers were prepared from the following pulps on the web former of the Institute of Paper Chemistry:

(1) Hardwood unbleached sulfite (Magnifite process),
(2) Softwood unbleached sulfite (Mitscherlich process),
(3) Hardwood neutral sulfite semi-chemical,
(4) Hardwood chemi-ground wood, and
(5) Softwood groundwood from chips given a mild sulfite-bisulfite pretreatment.

Such low cost papers containing significant amounts of lignin are especially useful in the present invention. However, it should be understood that other paper materials may also be used and that the lignin may be separately introduced or impregnated into the paper during or after its formation. This, of course, is a much less efficient method for producing a lignin containing receiving sheet.

Referring again to FIGURE 1, an original 11 having on it an image 12 to be copied in coated with a film 12 of a solution which contains a reactant which produces a color upon contact with lignin. The original and receiving sheet 11 and 10 respectively are overlaid as shown in FIGURE 1 and the assembly is then uniformly exposed to heat, indicated by arrows, as by an infrared lamp. The heat absorbed in the image 12 results in selective transfer or distillation of the associated portion of film 13 from the original 11 to the surface of the receiving sheet 10. At such points, the reactant in the material transferred reacts with lignin to produce an image, generally a visible image.

The film of liquid coated on the original may be a volatilizable acidic solution of one or more reactant compounds or compositions, including various phenols, aromatic amines, heterocyclics, etc. which react with lignin to form a colored image.

Representative of the phenolics is phloroglucinol which rapidly forms an intense purple-red-color with lignin in the present of aqua HCl. Similarly 3-hydroxyphenyl urea produces an intense orange color.

Representative of the aromatic bases is aniline hydrochloride which rapidly forms an intense yellow with lignin in the presence of water. Similarly, 4-aminophenylglycine hydrochloride yields an orange-red color and N,N-dimethyl-p-phenylene-diamine hydrochloride yields an intense purple.

Representative of the heterocyclics is 3-aminopyridine which rapidly forms an orange color with lignin in the presence of aqua HCl. Similarly skatole forms a deep purple color, 3,4-dimethyl-5-pyrazolone an orange color, and 2-methylindole a deep purple.

Representative of the inorganics is cobalt thiocyanate which rapidly forms a deep blue with lignin bearing papers in the presence of moisture. The use of this compound in combination with one or more of the precursors cited above provides outstanding color formation upon reaction with lignin.

Many other compounds are known which react with lignin to provide a broad range of color possibilities. In some cases, however, the rate of color formation is too slow to be practically useful alone as a pressure sensitive color precursor. Many combinations of precursors are possible which provide a wide range of color possibilities from bright blues, greens, and yellows, intense reds and purples through "near blacks."

In the embodiment shown in FIGURE 2, view a, liquid is transferred from the original 11 to the receiving sheet 10 by heating the original 11 coated with a film of oil 13. This produces a neutral image 14, as shown in view b, which does not react with the lignin. The latent liquid image 14 is then developed by dusting the surface of the receiving sheet with a particulate toner material 15 which adheres to the imaged areas, but not to be balance of the surface of the receiving sheet. Excess toner is removed and the sheet may then be passed between heated rolls to set the image 16. This drives the toner reactant into the paper to produce the desired color forming reaction with lignin.

In FIGURE 3, a variant of the procedure is shown where the original image 20 itself contains a heat transferable reactant. The sheet 11 which may be an original typed sheet or a master produced from an original, is placed in face-to-face relationship with the receiving sheet 10 and the assembly is heated. The heat drives off a portion of the reactant in the printed portion 20 forming a reaction image 21 with the lignin contained in the associated portion of the receiving sheet.

Example 1

A sheet of newsprint is provided. This is paper formed from a pulp made by a process known as "ground-wood pulping" and containing a substantial percentage of lignin, generally on the order of 10% to 20% by weight.

A typed original is then dampened on its reverse surface with an aqueous solution comprising about 2% by weight cobalt thiocyanate, 1% phloroglucinol and 0.5% HCl.

The original is then overlaid on the newsprint with the dampened portion in contact with the surface of the newsprint and the original is heated by irradiation with an infra-red lamp.

A colored image is formed in the newsprint in those regions corresponding to the printed zones of the original.

Example 2

An original is coated with a film of a volatile neutral oil. The original is overlaid on a receiving sheet of the type used in Example 1 and the assembly is heated in the same manner. The sheets are separated and the newsprint carrying the latent image of neutral oil is dusted with a toner comprising particles of cobalt thiocyanate. Excess toner is removed from the surface of the sheet and the sheet is hot-pressed for a few seconds. A colored image is formed on the surface of the receiving sheet corresponding to the printed zones of the original.

Example 3

An original is typed with a ribbon containing 5% of aminophenol glycine hydrochloride. The original is placed in face-to-face contact with a smooth foil master plate and the assembly is heated for a few minutes by infrared irradiation. The master is then separated from the original and placed in surface contact with a sheet of newsprint as described in Example 1. The master is then heated by infra-red irradiation and the sheets are separated. A colored image is found to have been formed on the surface of the newsprint in those areas corresponding to the printed zones of the original.

It will be apparent to those skilled in the art that various modifications may be made in the process as illustratively described without departing from the spirit or scope of the invention as expressed in the following claims.

What is claimed is:

1. A process for producing copies of an original, containing printed areas thereon, comprising providing a receiving sheet containing a substantial amount of a lignin material, heating said original to an extent sufficient to cause the printed areas to selectively absorb heat, transferring heat from the printed areas of the original to a volatilizable material capable of reacting with said lignin to form a color product, so as to distill said volatilizable material, condensing the distilled material on the surface of said receiving sheet so as to react with said lignin in said receiving sheet to form a colored image.

2. The method of claim 1 wherein said volatilizable material is first condensed on a master plate and then revolatilized and condensed on said receiving sheet.

3. The process of claim 1 wherein said volatilizable material is selected from the group consisting of phenols, aromatic amines, heterocyclic compounds and inorganic compounds.

4. The process of claim 1 wherein said receiving sheet is a paper receiving sheet containing naturally occurring lignin material.

5. A process for producing copies of an original containing printed areas thereon comprising, providing a receiving sheet containing a substantial amount of a lignin material, heating said original to an extent to cause the printed areas to selectively absorb heat, transferring heat from the printed areas of the original to a volatilizable neutral oil so as to distill said volatilizable neutral oil, condensing the distilled neutral oil on the surface of said receiving sheet so as to form a neutral latent image, and developing said neutral latent image with image toner particles capable of reacting with said lignin to produce a final color image.

6. The process of claim 5 wherein said volatilizable material is first condensed on a master plate and then revolatilized and condensed on said receiving sheet.

(References on following page)

References Cited

UNITED STATES PATENTS

| | | | |
|---|---|---|---|
| 3,121,650 | 2/1964 | Meissner | 250—65 X |
| 3,170,395 | 2/1965 | Gundlach et al. | 250—65 X |
| 3,262,386 | 7/1966 | Gordon | 250—65 X |
| 3,265,891 | 8/1966 | Games | 250—65 |
| 3,360,367 | 12/1967 | Stricklin | 117—1.7 X |
| 3,363,556 | 1/1968 | Shely et al. | 250—65 X |
| 3,377,286 | 4/1968 | Stricklin | 117—17.5 X |

FOREIGN PATENTS

| | | |
|---|---|---|
| 246,832 | 9/1962 | Australia. |
| 986,053 | 3/1965 | Great Britain. |
| 720,308 | 10/1965 | Canada. |

OTHER REFERENCES

Brauns, Frederick E., and Dorothy A. Brauns, "Color Reactions of Lignified Materials," in The Chemistry of Lignin, supplemental volume, Academic Press, 1960, pages 33–61.

WILLIAM D. MARTIN, Primary Examiner

E. J. CABIC, Assistant Examiner

U.S. Cl. X.R.

101—470; 117—21, 25, 37, 106, 118; 250—65; 260—124